United States Patent Office 2,743,687
Patented May 1, 1956

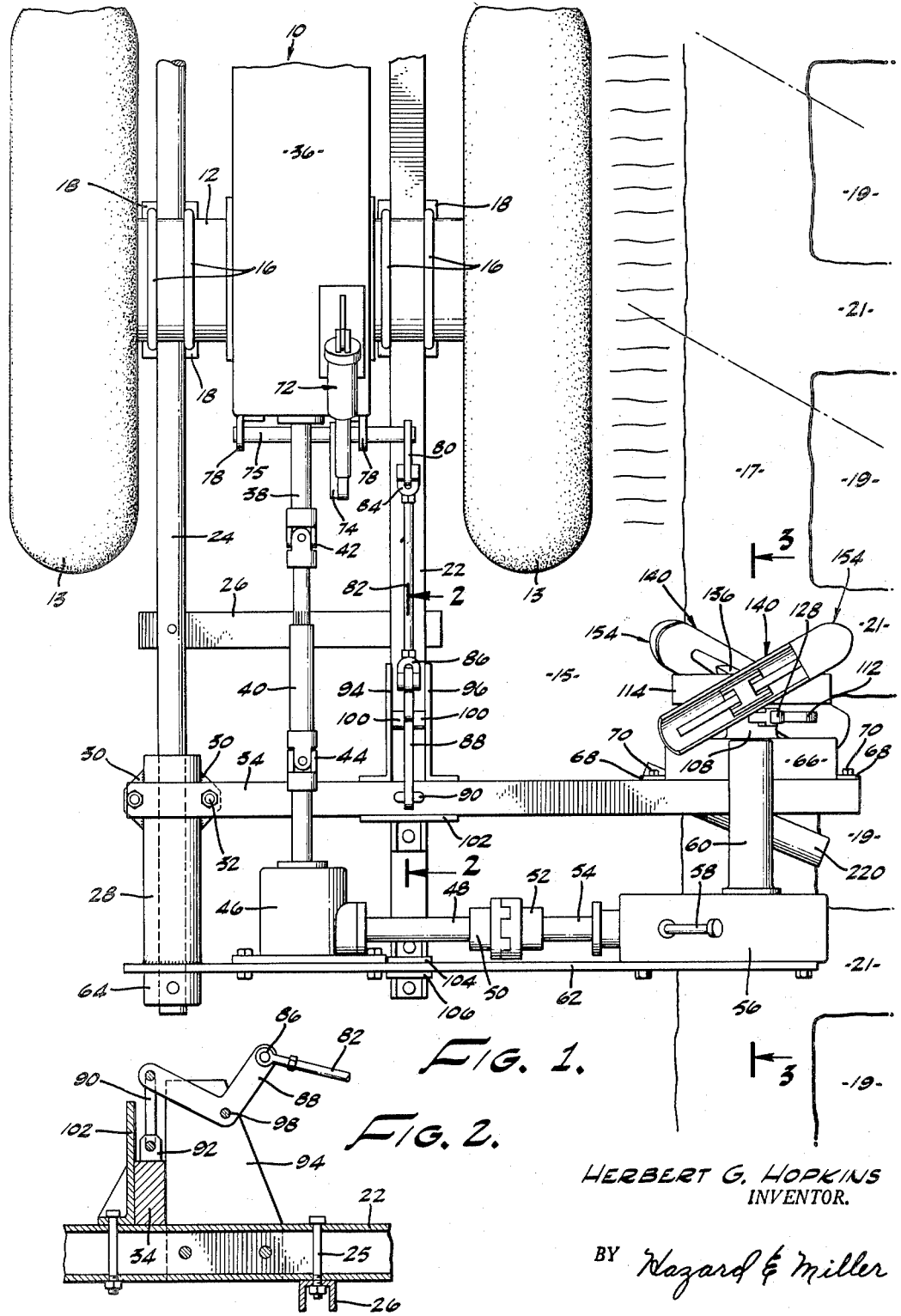

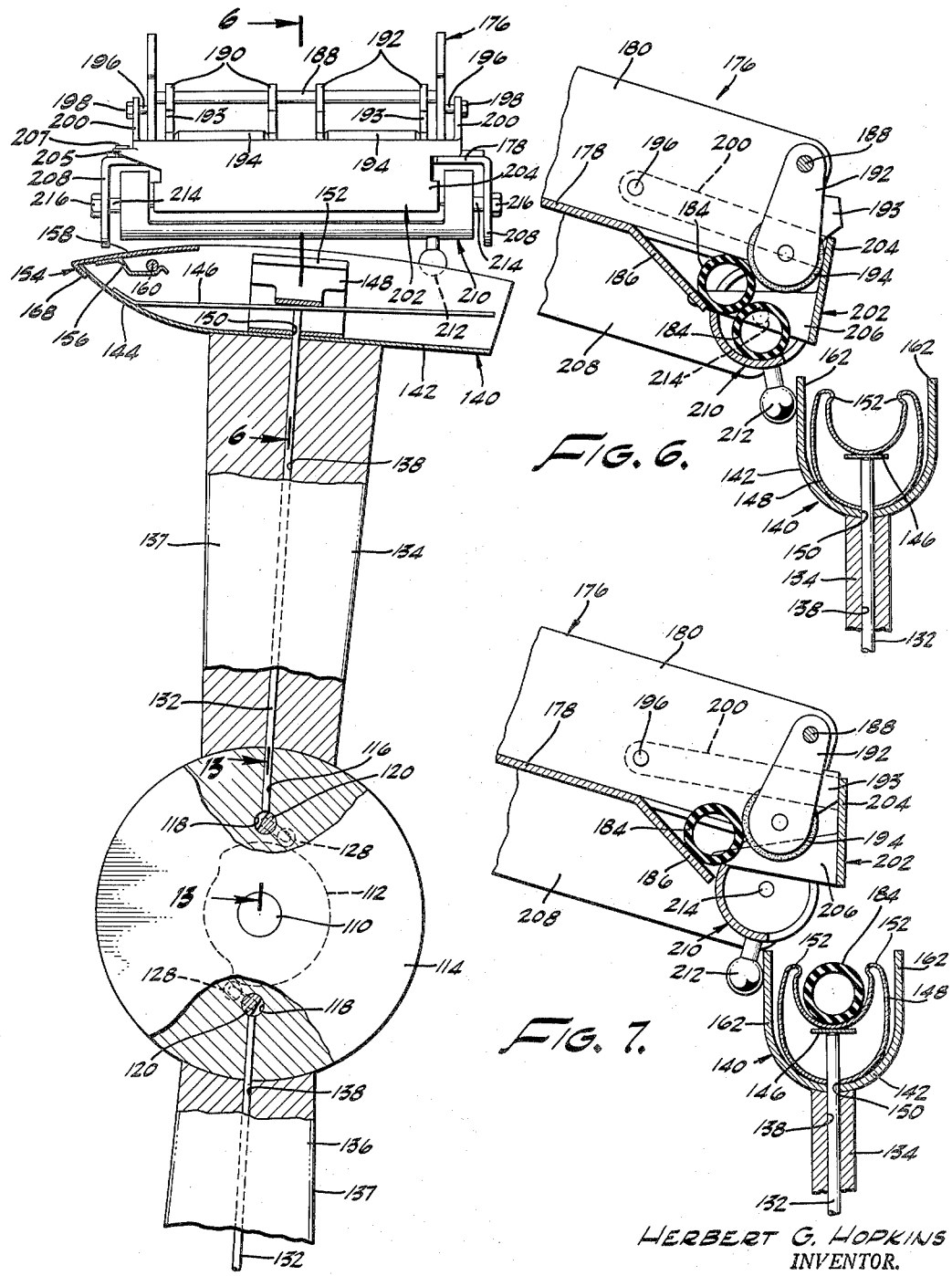

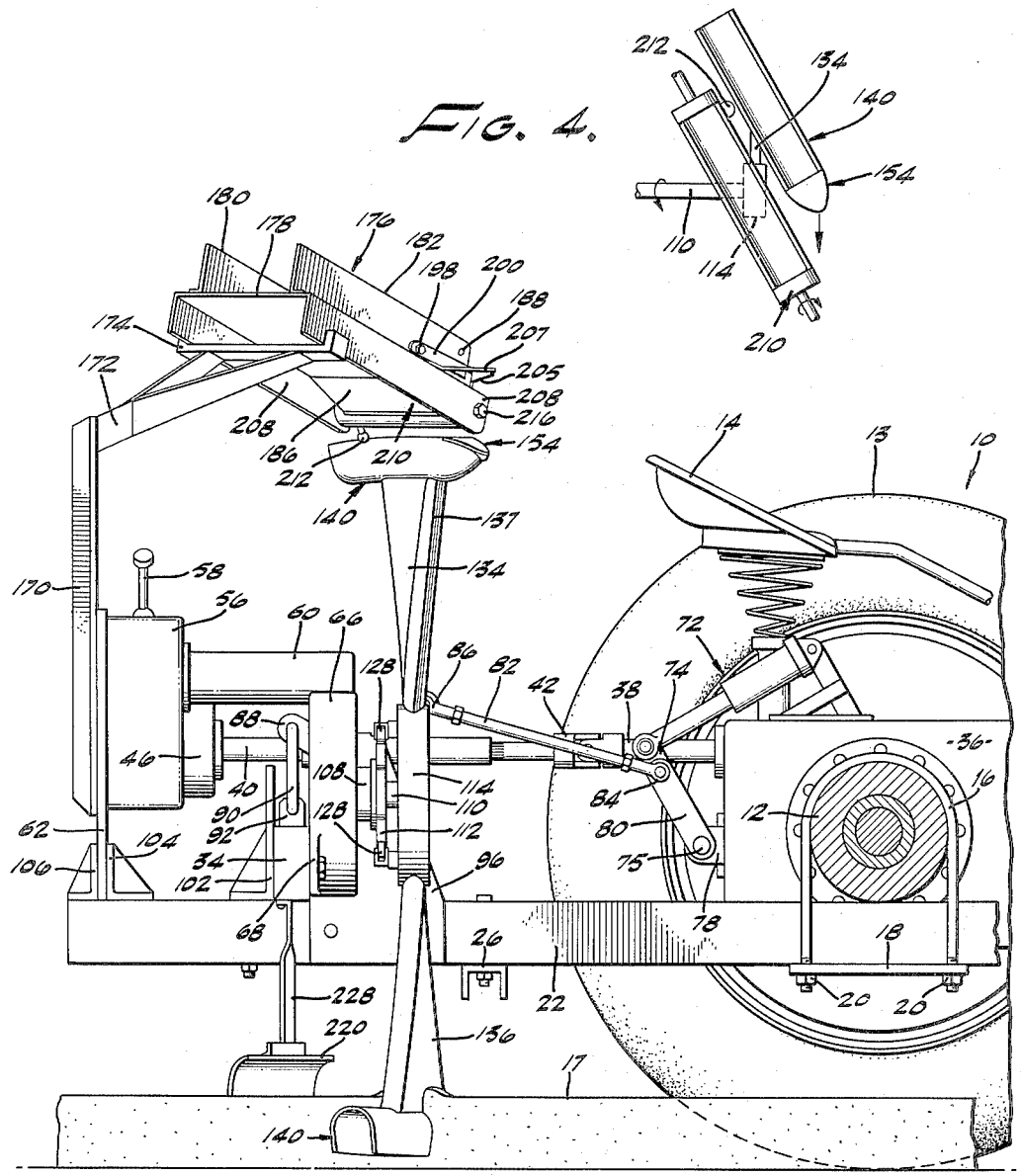
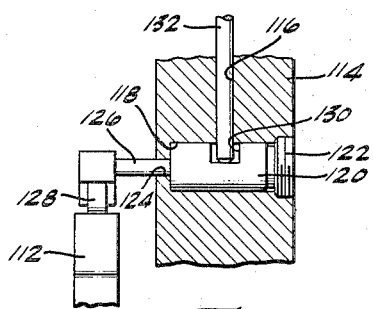

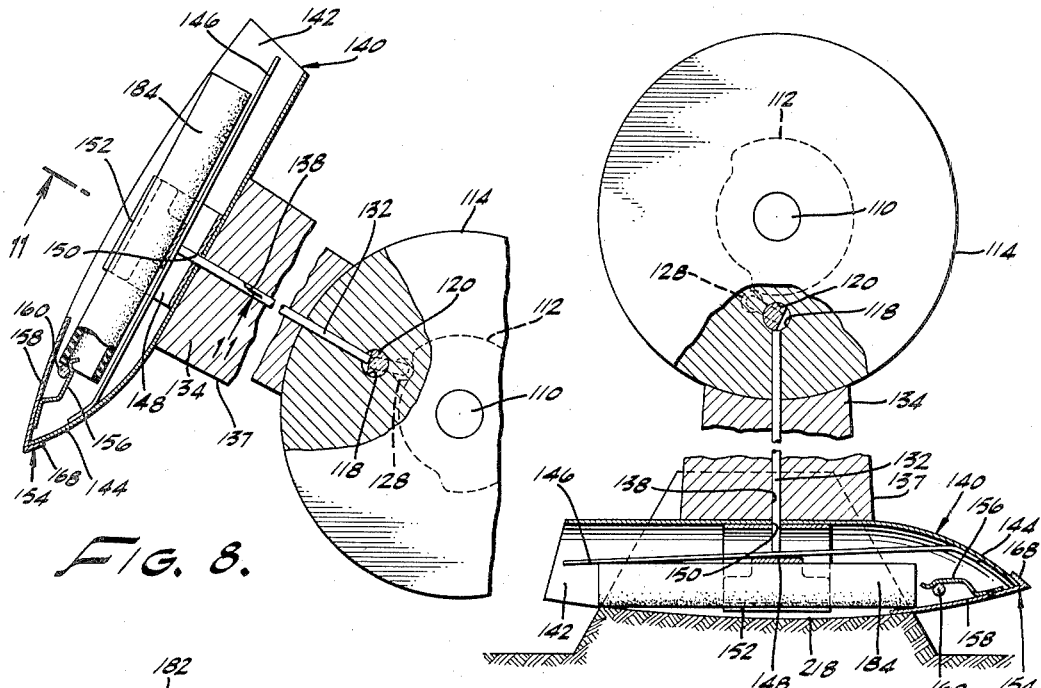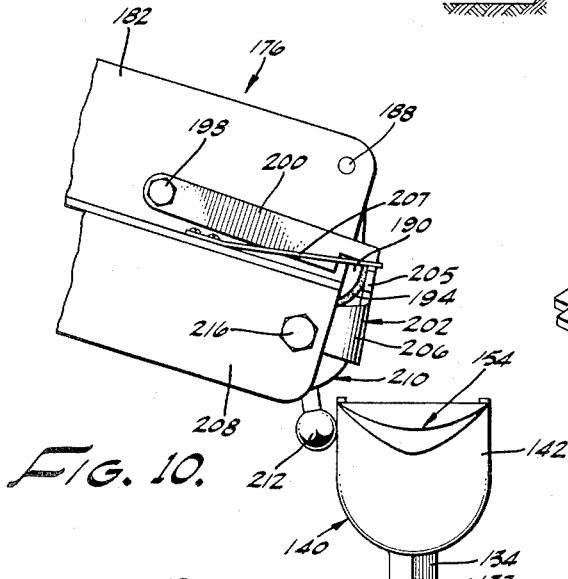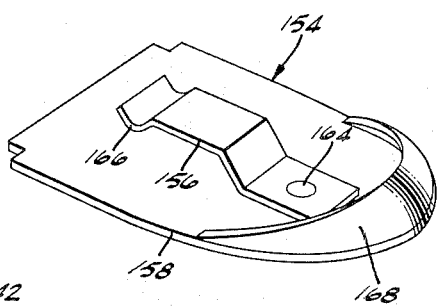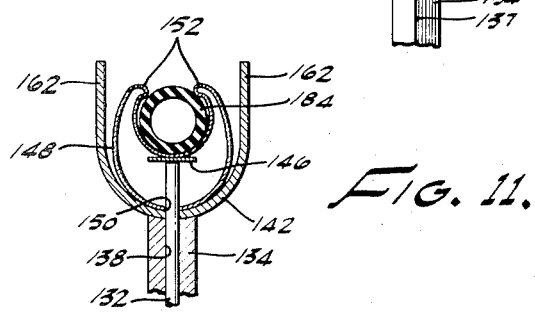

2,743,687

MACHINE FOR DEPOSITING TUBES IN THE RIDGE BETWEEN FEEDER DITCHES AND FURROWS

Herbert G. Hopkins, Yuma, Ariz.

Application December 3, 1953, Serial No. 396,009

12 Claims. (Cl. 111—5)

This invention has to do with agricultural equipment, and more particularly with a machine attachment for tractors and the like for depositing tubes between irrigation feeder ditches and furrows of a field.

In areas that rely upon irrigation to water crops, it is necessary that a feeder ditch be constructed at the high side of a field into which water may be directed that will enter the furrows of the field and flow downwardly therethrough to the end of the cultivated land involved.

The constructing of the feeder ditches causes a ridge to be formed between the ditch itself and the furrows. Heretofore, in order to form a communication between the furrows and the feeder ditch, it has been necessary to manually remove portions of the ridge. This operation has been time consuming and laborious.

Therefore, the principal object of this invention is to provide a machine attachment for a tractor or the like that will construct trenches in the feeder ditch ridge between the furrows and the feeder ditch, and will deposit in the aforementioned trenches tubes that will conduct water from the feeder ditch to the furrows of the cultivated field.

Another object of this invention is to provide a machine of the kind aforementioned that will deposit tubes between the feeder ditch and the furrows of a cultivated field at an angle to the path of travel of the tractor.

Another object of this invention is to provide a machine of the kind aforementioned that has power transmitting mechanism actuated by the tractor.

Another object of this invention is to provide a machine of the kind aforementioned that can be raised and lowered out of and into engagement with the feeder ditch ridge located between the feeder ditch and the furrows of the cultivated field.

A yet further object of this invention is to provide a machine of the kind aforementioned that has helical spokes arranged about a rotary hub that will convey via a carrier a tube to each furrow of the cultivated field.

A yet further object of this invention is to provide a carrier on the machine of the kind aforementioned that has a replaceable trench digging shoe thereon that has for its purpose the digging of the said trench and absorbing the initial impact of the work.

Another object of this invention is to provide as a part of the machine of the kind aforementioned, structure that is operatively related to the aforementioned helical spokes and carrier, and a positive means of depositing the tubes in constructed trenches at the time the trenches are dug.

Another object of this invention is to provide a tube magazine that will feed but one tube at a time to the tube carrier and trench digger.

Another object of this invention is to provide structure on the machine that has for its purpose the covering of the tube deposited in the constructed trenches.

With the foregoing and other objects in view, which will be made manifest in the following detailed description and specifically pointed out in the appended claims, reference is had to the accompanying drawings for an illustrative embodiment of the invention, wherein:

Figure 1 is a fragmentary plan view illustrating the power transmitting mechanism actuated by a tractor, and structure on a tube depositing machine for depositing tubes in a constructed trench but having the tube magazine removed in order that certain structure may be clearly viewed;

Fig. 2 is an enlarged fragmentary view taken on lines 2—2 of Fig. 1 looking in the direction of the arrows illustrating certain structure for raising and lowering the machine of this invention;

Fig. 3 is a fragmentary side elevational view illustrating the machine of this invention taken on lines 3—3 of Fig. 1 looking in the direction of the arrows which also includes the tube magazine absent in Fig. 1;

Fig. 4 is a fragmentary view illustrating the relationship and path of travel of the tube carrier and trench digging mechanism to the tube cradle of the tube magazine;

Fig. 5 is an enlarged fragmentary and cross-sectional view illustrating the tube carrier, magazine, spokes and cam-actuated structure which is a part of the machine of this invention;

Fig. 6 is a fragmentary cross-sectional view taken on lines 6—6 of Fig. 5 looking in the direction of the arrows illustrating the magazine mechanism and tube carrier;

Fig. 7 is a view similar to Fig. 6 but illustrating an advanced step wherein one of the tubes has been deposited in the tube carrier from the magazine and another tube retained in the latter;

Fig. 8 is a fragmentary cross-sectional view illustrating the carrier and related structure in a downward position prior to the carrier entering the ridge of a feeder ditch;

Fig. 9 is a view similar to Fig. 8 but illustrating a more advanced position of the carrier wherein the trench has been dug in the feeder ditch ridge and the tube is being deposited therein;

Fig. 10 is a fragmentary perspective view illustrating the relationship of the tube carrier to the tube magazine;

Fig. 11 is a fragmentary cross-sectional view taken on lines 11—11 of Fig. 8 looking in the direction of the arrows and illustrating a tube retained in the tube carrier;

Fig. 12 is a perspective view illustrating a shoe that may be removably attached to the leading end of the tube carrier; and Fig. 13 is an enlarged fragmentary view taken on lines 13—13 of Fig. 5 looking in the direction of the arrows illustrating the roller, cam and push rod that has for its purpose the ejecting and retaining of the tube when the tube is in the carrier.

Referring to the accompanying drawings wherein similar reference characters designate similar parts throughout, 10 designates a tractor having an axle wheel housing 12 thereon and having a spring supported seat 14 attached thereto. The wheels 13 of the tractor 10 are in the feeder ditch 15 along side of which is the feeder ditch ridge 17. Extending perpendicular to feeder ditch ridge 17 are the furrows 19 of the cultivated field, the furrows 19 being bordered by the furrow ridges 21. Secured to the axle housing 12 by U-bolts 16, bars 18, and nuts 20 is a frame comprising a pair of elongated members 22 and 24.

Frame member 22 is rectangular as may be seen by referring to Figs. 1, 2 and 3 of the drawings, and frame member 24 is cylindrical as may be determined by referring to Fig. 1 of the drawings. Removably attached, by a nut and bolt assembly 25, to each member 22 and 24 of the frame intermediate their ends is a transverse bar 26 that has for its purpose the reinforcing of the frame members 22 and 24 and maintaining them equally spaced.

Located on frame member 24 remote from the axle housing 12 is a hollow, cylindrical member 28. Member 28 is rotatable about frame member 24. Member 28 has welded thereto ears 30. Extending perpendicular to frame member 24 and secured to member 28 by nuts and bolts 32 or the like is an elongated lifting bar 34. Lifting bar 34 extends across and is supported upon frame member 22 when the machine of this invention is in the operable position. Extending from the tractor 10 is power transmitting mechanism which is actuated by the motor 36 of the tractor. The power transmitting mechanism includes a pair of shafts 38 and 40, the former being telescoped into the latter. Said shafts 38 and 40 have universal joints 42 and 44 thereon.

Shaft 40 is interconnected to a right angle drive located in housing 46. A shaft 48 having a toothed clutch collar 50 extends from housing 46 parallel to lifting bar 34. Clutch collar 50 meshes with a complementary toothed clutch collar 52 on shaft 54 that extends into the transmission and differential housing 56. The transmission located in housing 56 is known as an over- and under-drive. Also located in housing 56 is a clutch actuating mechanism. Extending outwardly from housing 56 is a clutch actuating lever 58 that will disengage and engage clutch collars 50 and 52.

Extending perpendicular from housing 56 and parallel to shafts 38 and 40 is a shaft housing 60. Drive housing 46 and housing 56 are bolted or otherwise attached to a flat plate 62, one end of which is welded to cylindrical member 28 and supported by frame members 22 and 24. Removably attached to frame member 24 on the extreme free end thereof in order to more securely retain plate 62 in place is a collar 64. Shaft housing 60 and the shaft located therein is interconnected to final gear drive housing 66. Final gear drive housing 66 has located on each side thereof a web or ear 68. The webs or ears 68 and bolts 70 mount the housing 66 on lifting bar 34.

The mechanism for raising and lowering the lifting bar 34 and all structure related or interconnected thereto comprises a conventional hydraulic actuating mechanism 72 which has an arm 74 pivotally attached thereto. Hydraulic actuating mechanism 72 is then in turn actuated by the tractor motor 36. Arm 74 is rigidly secured to a shaft 75 mounted on the tractor 10 by bracket bearings 78.

On the exertme end of shaft 75 overlying frame member 22 is an arm 80 pivotally interconnected to a connecting rod 82. Connecting rod 82 has on each end thereof and releasably attached thereto U-shaped couplings 84 and 86. U-shaped coupling 86 is pivotally attached to a bell crank 88. The bell crank 88 has freely swingable on the end thereof a link 90. Link 90 is in turn pivotally secured to a bracket 92 which is in turn attached to lifting bar 34.

The bell crank 88 is pivotally attached to guides 94 and 96 by a shaft 98. Located between each guide 94 and 96 and the bell crank 88 is a spacer 100. Spacers 100 have for their purpose the maintaining of the bell crank 88 in an aligned position with link 90 and bar 82. Also, bell crank 88 is maintained by the spacers equally spaced inwardly from the guides 94 and 96 and in an overlying position to frame member 22.

Secured to frame member 22 and in opposed relationship to guides 94 and 96 is another guide 102. Also located on frame member 22 and secured thereto and on each side of plate 62 are guides 104 and 106. These guides have for their purpose the retaining of lifting bar 34 and the plate 62 parallel to each other when the lifting bar 34 and plate 62 are in the horizontal position illustrated in Fig. 3 of the drawings. These guides also direct the path of travel of the lifting bar 34 and the plate 62 when they are being raised or lowered.

Extending outwardly from housing 66 is a collar 108. Extending through collar 108 from housing 66 is a rotatable shaft 110. Secured to collar 108 is a cam 112. Rotatable on the shaft 110 is a hub 114. In the hub 114 there is a radial bore 116 which communicates with an axially extending opening 118.

Removably located in opening 118 is a cam 120. Opening 118 when the cam 120 is in place is closed by a plug 122 (Fig. 13). Extending outwardly from opening 118 is another opening 124 which has extending therein a shaft 126 which is removably attached to cam 120. Connected to the extreme free end of shaft 126 by a crank arm is a roller assembly 128 which maintains a continuous contact with rigidly held cam 112. Cam 120 has a groove 130 formed therein which receives the free end of a push rod 132 which is removably placed in bore 116 of the hub 114.

Welded or otherwise secured to hub 114 are elongated helical spokes 134 and 136. These spokes are twisted considered radially as is illustrated in Fig. 3. Helical spokes 134 and 136 each have a bore 138 formed therein which is in alignment with bore 116 and into which push rods 132 extend. Helical spokes 134 and 136 have a tapered leading edge 137. Attached thereon to the free ends of spokes 134 and 136 are tube carriers, broadly designated by 140. Carrier 140 comprises an elongated U-shaped housing 142 having the leading end 144 thereof arcuately curved away from the spokes 134 and 136 in a manner as may be seen in Figs. 5, 8 and 9 of the drawings.

Welded or riveted in U-shaped housing 142 at the leading end 144 thereof is a flat spring 146. Spring 146 rests upon and is actuated by push rods 132. Also riveted, welded or otherwise attached to the housing 142 intermediate the ends thereof is an internally-opened crescent-shaped spring 148 having an opening 150 therein through which push rods 132 extend. The ends 152 of spring 148 are arcuately curved inwardly toward each other. Flat spring 146 extends through the internally-opened crescent spring 148 in a manner as may be seen in Figs. 5, 6, 7, 8, 9 and 11 of the drawings.

Removably attached to the leading end 144 of the carrier 140 is a shoe or plow broadly designated by 154. Shoe 154 has an irregular shaped spring 156 riveted or otherwise attached to the sole or plate 158 thereof that may be snapped over a bar 160 interconnecting the legs 162 of the U-shaped housing 142.

An arcuate projection 166 on spring 156 curves away from plate 158 as may be seen by referring to Figs. 5 and 12 of the drawings. The shoe 154 has an arcuately shaped toe 168 thereon that extends over the exterior of leading end 144 in a manner as may be seen in Figs. 5, 8 and 9 of the drawings.

Fixed to plate 62 and extending upwardly therefrom is a bracket 170. Projecting outwardly therefrom and secured to bracket 170 is a Y-shaped bracket 172. Secured to each leg of the Y-shaped bracket 172 is a U-shaped bar 174. Bar 174 supports tube magazine broadly designated by 176. Tube magazine 176 is inclined downwardly. Tube magazine 176 comprises a U-shaped bottom wall 178 having a pair of spaced upright side walls 180 and 182 attached thereto. Bottom wall 178 is inclined downwardly in order that tubes 184 may be fed by gravity toward the end of the magazine 176 remote from Y-shaped bracket 172. The bottom wall 178 has a portion 186 thereon which is bent downwardly at an acute angle as may be seen in Figs. 3, 6 and 7 of the drawings. Extending between the walls 180 and 182 adjacent one end of magazine 176 and interconnecting the same is a shaft 188. Depending from the shaft 188 and freely swingable thereon are two pair of links 190 and 192. Links 190 and 192 each have a cam 193 integral therewith and intermediate the ends thereof. Interconnecting each pair of links is a rubber roller 194.

Extending outwardly from each wall 180 and 182 of magazine 176 are shafts 196 having bolts 198 removably attached thereto. Freely swingable on shafts 196 and interconnected thereto by arms 200 is a gate broadly designated by 202. Gate 202 comprises an elongated, flat panel 204 from which are bent the arms 200. Also integral with panel 204 and bent in the direction comparable with arms 200 are triangular-shaped arms 206, there being one arm on each end of panel 204. Panel 204 has a triangular projection 205 on one end thereof. Bearing against projection 205 is a flat spring 207 which is riveted, bolted or otherwise attached to bottom wall 178. Spring 207 bearing down on triangular projection 205 on the panel 204 urges gate 202 to the position shown in Fig. 6 of the drawings.

Pivotally secured to each leg 208 of U-shaped bottom wall 178 of magazine 176 and underlying rollers 194 is a semi-cylindrical cradle 210 which receives, one at a time, tubes 184. Integral with cradle 210 and extending therefrom is a roller cam 212 which is engaged by a leg 162 of carrier 140. Cradle 210 is rotatably secured to legs 208 by shafts 214 which are held in place by nuts 216.

The operation of the device is as follows:

Power is transmitted by the tractor through shafts 38 and 40 to right angle drive in housing 46. From right angle drive in housing 46, power is transmitted through shafts 48 and 54 via clutch collars 50 and 52 to the transmission and differential in housing 56. From the transmission and differential in housing 56 power is transmitted through the shaft in housing 60 to final drive gear located in housing 66 to hub 114 secured on rotatable shaft 110 extending outwardly from final gear drive housing 66.

The carriers being integrally connected to the hub 114 by helical spokes 134 and 136 are caused to rotate therewith. Tubes 184 are placed in magazine 176 and are gravitationally fed toward gate 202 and cradle 210. Leg 162 on carrier 140 strikes and bears against cam 212 on cradle 210. The carrier 140 by virtue of the helical spoke to which carrier 140 is attached travels in the general direction indicated by the arrow seen in Fig. 4 of the drawings. This direction of travel and the striking of cam 212 by leg 162 causes cradle 210 having a tube 184 located therein to move or pivot away from gate 202 in the manner as illustrated in Fig. 7 of the drawings.

Triangular-shaped arms 206 on gate 202 are caused to rest upon the cradle 210 by the downward urging of flat spring 207. When the cradle having tube 184 therein is swung in a manner as may be seen in Fig. 7 of the drawings, the tube is caused to drop into the crescent-shaped spring 148 in carrier 140. The urging of the cradle 210 to the position shown in Fig. 7 of the drawings causes gate 202 via triangular-shaped arms 206 to strike cams 193 on links 190 and 192. This striking of the cams 193 urges the two pairs of links 190 and 192 with their respective rollers 194 to the position illustrated in Fig. 7 of the drawings. The rollers, in turn, contact the tube 184 next in line to the one deposited in the carrier 140 urging the same back up portion 186. This urging of the second one to-be-deposited tube 184 to the position shown in Fig. 7 coupled with the position of the cradle 210 restrains the depositing of the next-to-be-deposited tube from following the first into the carrier 140.

Once the carrier has advanced from the position of releasing the tube 184 the flat spring 207 which bears against projection 205 of the gate 202 urges the gate, cradle and related structure to the closed position or non-ejecting position seen in Fig. 6 of the drawings. The tube 184 deposited in the carrier 140 is caused to assume the position seen in Fig. 8 when the carrier has assumed the position illustrated in Fig. 8. Additionally, when the carrier is in the position as illustrated in Figs. 6 and 7 of the drawings the push rod 132 is caused to bear against flat spring 146 which, in turn, is caused to bear against crescent-shaped spring 148 which, in turn, urges the ends 152 of crescent-shaped spring 148 outwardly in a manner to receive tube 184. This result is accomplished by the roller assembly 128 rotating on cam 112 and the action thereof is transmitted to push rod 132 through cam 120.

When the carrier 140 is in the position illustrated in Fig. 8 of the drawings the ends 152 of the crescent-shaped spring 148 are permitted to close about tube 184 when the push rod and related structure assume the position illustrated in Fig. 8. As the carrier advances to the position illustrated in Fig. 9 of the drawings, the shoe 154 attached to carrier 140 enters the ridge 17 caused by the construction of the feeder ditch 15 at an angle to the forward path of travel of the tractor.

When the carrier has assumed the position as illustrated in Fig. 9 of the drawings and the trench 218 is dug, the cam 120 is caused to assume via roller assembly 128 and cam 112 the position illustrated in Fig. 9 of the drawings. This position is identical to that illustrated in Fig. 5 of the drawings.

The push rod due to the cam being in the position illustrated in Fig. 9 urges the ends 152 of crescent spring 148 outwardly. The crescent spring 148 being in the released position permits the tube 184 to be deposited in the trench 218. Coupled with the released position of crescent spring 148 for depositing tube 184 is the position of the flat spring 146. Flat spring 146 tends to urge tube 184 outwardly away from crescent spring 148 and this urging combined with tube 184 contacting the soil of the trench enables the tube to release itself from the arcuate projection 166 of the spring 156. In other words, the tube 184 is helped to be deposited in the trench 218 by virtue of the fact that it drags the ground on entering the same. In order that one tube be deposited in the trench 218 between the feeder ditch 15 and the furrows 19 of the cultivated field two structural arrangements are relied upon.

The helical spokes 134 and 136 have an angularity that causes the tubes to be deposited at an angle to the forward path of travel of the tractor 10 and at the same time this particular helical angle corresponds, to a degree, with the distance between each furrow 19. This helical arrangement of the spokes 134 and 136 combined with the over- and undertransmission located in housing 56 enables but one tube 184 to be deposited in the trench 218 between furrows 19 and feeder ditch 15. In other words, if the tractor for one reason or another travels forwardly at an erratic speed, which if nothing were done would cause a tube to be improperly deposited, the speed of the transmission could be altered to compensate for the erratic forward speed of the tractor 10. When it is desired to raise the carriers out of soil engagement the intermeshing clutch collars 50 and 52 may be disengaged by actuating lever 58 which, in turn, will disengage the power transmitting mechanism. Once this is accomplished the hydraulic actuating mechanism 72 may be caused to transmit its power to link 80, bar 82, bell crank 88 and lifting bar 34 through link 74 and shaft 75 which will result in lifting the lifting bar 34 and all the structure that may be attached or interconnected thereto.

To lower the lifting bar 34 and structure attached or interconnected thereto, it is but necessary to reverse the action of the hydraulic mechanism 72. Once the tubes 184 are deposited in trenches 218 they are covered by a sweep or blocker 220 which depends from lifting bar 34 and is attached thereto by an arm and bracket assembly 228.

Various changes may be made in the details of construction without departing from the spirit and scope of the invention as defined by the appended claims.

I claim:

1. A machine for depositing tubes in a ridge between feeder ditches and furrows comprising a tractor, a frame attached to the tractor, power transmitting mechanism supported by said frame and actuated by said tractor, a rotatable shaft supported by said frame and rotated by said mechanism, a hub on the shaft, at least one spoke on said hub extending radially therefrom, a tube-receiving and depositing carrier on the free end of said spoke for digging a trench in the ridge formed by the construction of the feeder ditch, tube holding and releasing means on the carrier for holding the tube until the trench has been dug, and a tube magazine supported by said frame conveying tubes to said carrier.

2. A machine for depositing tubes in a ridge between feeder ditches and furrows comprising a tractor, a frame attached to the tractor, power transmitting mechanism supported by said frame and actuated by said tractor, a rotatable shaft supported by said frame and rotated by said mechanism, a hub on the shaft, at least one spoke on said hub extending radially therefrom, a tube-receiving and depositing carrier on the free end of said spoke for digging a trench in the ridge formed by the construction of the feeder ditch, tube holding and releasing means on the carrier for holding the tube until the trench has been dug, a tube magazine supported by said frame conveying tubes to said carrier, and structure interconnected with and actuated by said tractor for raising and lowering the carrier out of and into trench digging contact with the feeder ditch ridge.

3. A machine for depositing tubes in a ridge between feeder ditches and furrows comprising a tractor, a frame attached to the tractor, power transmitting mechanism supported by said frame and actuated by said tractor, a rotatable shaft supported by said frame and rotated by said mechanism, a hub on the shaft, at least one spoke on said hub extending radially therefrom, a tube-receiving and depositing carrier on the free end of said spoke for digging a trench in the ridge formed by the construction of the feeder ditch, tube holding and releasing means on the carrier for holding the tube until the trench has been dug, and a tube magazine supported by said frame conveying tubes to said carrier, said spoke having a helical twist in order that the tubes will be deposited in said feeder ditch ridge adjacent the furrows.

4. A machine for depositing tubes in a ridge between feeder ditches and furrows comprising a tractor, a frame attached to the tractor, power transmitting mechanism supported by said frame and actuated by said tractor, a rotatable shaft supported by said frame and rotated by said mechanism, a hub on the shaft, at least one spoke having a helical twist on said hub extending radially therefrom, a tube-receiving carrier on the free end of said spoke for digging a trench in the ridge between the feeder ditch and furrow at an angle to the path of travel of said tractor, tube holding and releasing means on the carrier for holding the tubes until the trench has been dug, and a tube magazine supported by said frame conveying tubes to said carrier.

5. A machine for depositing tubes in a ridge between feeder ditches and furrows comprising a tractor, a frame attached to the tractor, power transmitting mechanism supported by said frame and actuated by said tractor, a rotatable shaft supported by said frame and rotated by said mechanism, a hub on the shaft, at least one spoke on said hub extending radially therefrom, a tube-receiving and depositing carrier on the free end of said spoke for digging a trench in the ridge formed by the construction of the feeder ditch, said carrier having a shoe releasably attached thereto for absorbing the initial impact of digging the trench in the feeder ditch ridge, tube holding and releasing means on the carrier for holding the tube until the trench has been dug, and a tube feeding magazine supported by said frame feeding tubes to said carrier.

6. A machine for depositing tubes in a ridge between feeder ditches and furrows comprising a tractor, a frame attached to the tractor, power transmitting mechanism supported by said frame and actuated by said tractor, a rotatable shaft supported by said frame and rotated by said mechanism, a hub on the shaft, at least one spoke on said hub extending radially therefrom, a tube-receiving and depositing carrier on the free end of said spoke for digging a trench in the ridge formed by the construction of the feeder ditch, tube holding and releasing means on the carrier for holding the tube until the trench has been dug, said tube holding and releasing means including cam and rod actuated springs, and a tube feeding magazine supported by said frame feeding tubes to said carrier.

7. A machine for depositing tubes in a ridge between feeder ditches and furrows comprising a tractor, a frame attached to the tractor, power transmitting mechanism supported by said frame and actuated by said tractor, a rotatable shaft supported by said frame and rotated by said mechanism, a hub on the shaft at least one spoke on said hub extending radially therefrom, a tube-receiving and depositing carrier on the free end of said spoke for digging a trench in the ridge formed by the construction of the feeder ditch, tube holding and releasing means on the carrier for holding the tube until the trench has been dug, and a tube magazine supported by said frame conveying tubes to said carrier, said magazine having a cam actuated gate and cradle thereon for releasing a tube to said carrier and for retaining tubes in said magazine.

8. A device of the class described comprising a frame attachable to a tractor, a shaft rotatably mounted upon the frame for rotation about an axis substantially parallel to the direction of movement of the tractor, means for rotating the shaft by the power plant of the tractor, tube-carrying means mounted on the shaft constructed and arranged to be swung by the shaft through a ridge formed between a feeder ditch and the ends of adjacent furrows, means for depositing tubes in the tube-carrying means in a position to be carried by said last-named means into the ridge, retaining means for retaining the tubes in the tube-carrying means until the tubes are carried thereby into the ridge, and means for causing the retaining means to release the tubes from the tube-carrying means when the tubes are in position in the ridge.

9. A device of the class described comprising a frame attachable to a tractor, a shaft rotatably mounted upon the frame for rotation about an axis substantially parallel to the direction of movement of the tractor, means for rotating the shaft by the power plant of the tractor, tube-carrying means mounted on the shaft constructed and arranged to be swung by the shaft through a ridge formed between a feeder ditch and the ends of adjacent furrows, a magazine mounted on the frame arranged to receive a plurality of tubes, means for releasing tubes from the magazine sequentially for deposit in the tube-carrying means when the tube-carrying means is approximately in its uppermost position, retaining means on the tube-carrying means for retaining the tubes in the tube-carrying means until carried thereby into the ridge, and means for causing the retaining means to release the tubes from the tube-carrying means when the tubes are in position in the ridge.

10. A device of the class described comprising a frame attachable to a tractor, a shaft rotatably mounted upon the frame for rotation about an axis substantially parallel to the direction of movement of the tractor, means for rotating the shaft by the power plant of the tractor, tube-carrying means mounted on the shaft constructed and arranged to be swung by the shaft through a ridge formed between a feeder ditch and the ends of adjacent furrows, shoes at the forward ends of the tube-carrying means for digging trenches through the ridge for the positioning of the tubes therein, gripping means in the tube-carrying means normally biased to grip a tube positioned therein, a magazine mounted on the frame arranged to receive a plurality of tubes, means for sequentially releasing tubes from the magazine to be deposited in the tube-carrying means when the tube-carrying means is in its uppermost position, and cam-actuated means for causing the gripping means to open to receive a tube from the magazine when said tube-carrying means is in its uppermost position, then to grip the tube while the tube is being carried into the ridge, and then to release the tube when the tube is positioned in the ridge.

11. A device of the class described comprising a frame attachable to a tractor, a shaft rotatably mounted upon the frame for rotation about an axis substantially parallel to the direction of movement of the tractor, means for rotating the shaft by the power plant of the tractor, tube-carrying means mounted on the shaft constructed and arranged to be swung by the shaft through a ridge formed between a feeder ditch and the ends of adjacent furrows, shoes at the forward ends of the tube-carrying means for digging trenches through the ridge for the positioning of tubes therein, a magazine on the frame arranged to receive tubes to be deposited, means for sequentially releasing tubes from the magazine in timed relation to the rotation of said shaft to deposit a tube in the tube-carrying means when the tube-carrying means is in its uppermost position, resilient gripping means in the tube-carrying means biased to grip a tube positioned therein, and means for causing the gripping means to open when a tube is about to be deposited in the tube-carrying means, then to grip the tube as the tube is carried from the magazine into the ridge, and then to release the tube when the tube occupies a position in the ridge.

12. A device of the class described comprising a frame attachable to a tractor, a shaft rotatably mounted upon the frame for rotation about an axis substantially parallel to the direction of movement of the tractor, means for rotating the shaft by the power plant of the tractor, tube-carrying means mounted on the shaft adapted to be swung thereby through a ridge formed between a feeder ditch and the ends of adjacent furrows, shoes at the forward ends of the tube-carrying means for digging trenches through the ridge for the positioning of tubes therein, a magazine on the frame arranged to receive tubes to be deposited, means for sequentially releasing tubes from the magazine in timed relation to the rotation of said shaft to deposit a tube in the tube-carrying means when the tube-carrying means is in its uppermost position, resilient gripping means in the tube-carrying means biased to grip a tube positioned therein, means for causing the gripping means to open when a tube is deposited in the tube-carrying means, then to grip the tube as the tube is carried from the magazine into the ridge and then to release the tube when the tube occupies a position in the ridge, said tube-carrying means being angularly disposed on said shaft so as to describe a substantially helical path as the device moves forward, and means for varying the speed of rotation of the shaft so as to be commensurate with the forward progress of the tractor.

References Cited in the file of this patent

UNITED STATES PATENTS 332,126    White    Dec. 8, 1885